United States Patent
Liu et al.

(10) Patent No.: US 9,889,841 B2
(45) Date of Patent: Feb. 13, 2018

(54) METHOD AND SYSTEM FOR STARTING ENGINE OF HYBRID VEHICLE

(71) Applicant: BYD COMPANY LIMITED, Shenzhen (CN)

(72) Inventors: Changjiu Liu, Shenzhen (CN); Guorui Liu, Shenzhen (CN); Xiaowei Zhou, Shenzhen (CN); Heping Ling, Shenzhen (CN); Shibin Xie, Shenzhen (CN); Yubo Lian, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/102,677

(22) PCT Filed: Dec. 16, 2014

(86) PCT No.: PCT/CN2014/094003
§ 371 (c)(1),
(2) Date: Jun. 8, 2016

(87) PCT Pub. No.: WO2015/090192
PCT Pub. Date: Jun. 25, 2015

(65) Prior Publication Data
US 2016/0304082 A1    Oct. 20, 2016

(30) Foreign Application Priority Data
Dec. 16, 2013 (CN) .......................... 2013 1 0690524

(51) Int. Cl.
*B60L 9/00* (2006.01)
*B60L 11/00* (2006.01)
(Continued)

(52) U.S. Cl.
CPC ............... *B60W 20/15* (2016.01); *B60K 6/48* (2013.01); *B60L 11/16* (2013.01); *B60W 10/02* (2013.01);
(Continued)

(58) Field of Classification Search
CPC .......... B60K 6/48; B60L 11/16; B60W 10/02; B60W 10/06; B60W 10/08; B60W 10/113;
(Continued)

(56) References Cited

U.S. PATENT DOCUMENTS 5,337,848 A * 8/1994 Bader ...................... B60K 6/36
                                                                180/65.25
6,524,217 B1    2/2003 Murakami et al.
(Continued)

FOREIGN PATENT DOCUMENTS

CN           2693506 Y      4/2005
CN         101141015 A      3/2008
(Continued)

OTHER PUBLICATIONS

The World Intellectual Property Organization (WIPO) International Search Report for PCT/CN2014/094003 dated Mar. 10, 2015.

*Primary Examiner* — Rachid Bendidi
(74) *Attorney, Agent, or Firm* — Anova Law Group, PLLC

(57) ABSTRACT

A method for starting an engine of a hybrid vehicle is provided. The method includes: detecting a speed of the hybrid vehicle when receiving an instruction to start the engine; and outputting an inertia torque generated by a transmission of the hybrid vehicle to a crankshaft of the engine to start the engine when the speed is larger than or equal to a predetermined speed. Further, a system for
(Continued)

starting an engine of a hybrid vehicle and a hybrid vehicle including the system are provided.

18 Claims, 2 Drawing Sheets

(51) Int. Cl.
| | |
|---|---|
| G05D 1/00 | (2006.01) |
| G05D 3/00 | (2006.01) |
| G06F 7/00 | (2006.01) |
| G06F 17/00 | (2006.01) |
| B60W 20/15 | (2016.01) |
| B60W 10/06 | (2006.01) |
| B60W 10/08 | (2006.01) |
| B60W 20/40 | (2016.01) |
| B60L 11/16 | (2006.01) |
| B60W 10/02 | (2006.01) |
| B60K 6/48 | (2007.10) |
| B60W 10/113 | (2012.01) |
| B60W 20/00 | (2016.01) |
| F02N 5/04 | (2006.01) |
| F02N 11/00 | (2006.01) |
| B60W 10/10 | (2012.01) |

(52) U.S. Cl.
CPC ............ *B60W 10/06* (2013.01); *B60W 10/08* (2013.01); *B60W 10/113* (2013.01); *B60W 20/00* (2013.01); *B60W 20/40* (2013.01); *F02N 5/04* (2013.01); *F02N 11/00* (2013.01); *B60W 10/10* (2013.01); *B60W 2510/1095* (2013.01); *B60W 2520/10* (2013.01); *B60W 2520/105* (2013.01); *B60Y 2300/49* (2013.01); *F02N 2200/0801* (2013.01); *F02N 2300/2002* (2013.01); *Y02T 10/6221* (2013.01); *Y02T 10/6286* (2013.01); *Y10S 903/915* (2013.01); *Y10S 903/946* (2013.01)

(58) Field of Classification Search
CPC ...... B60W 10/10; B60W 20/00; B60W 20/15; B60W 20/40; B60W 2510/1095; B60W 2520/10; B60W 2520/105; F02N 11/00; F02N 5/04; B60Y 2300/49; B60Y 2300/2002; Y02T 10/6286; Y02T 10/915; Y02T 10/946

See application file for complete search history.

(56) References Cited

U.S. PATENT DOCUMENTS

| | | | |
|---|---|---|---|
| 8,401,768 B2* | 3/2013 | Lewis | .................. F02D 41/062 701/112 |
| 2002/0019691 A1 | 2/2002 | Matsubara et al. | |
| 2003/0068232 A1 | 4/2003 | Iwanami et al. | |
| 2003/0233840 A1 | 12/2003 | Choi et al. | |
| 2005/0044873 A1 | 3/2005 | Tamai et al. | |
| 2005/0209760 A1* | 9/2005 | Tabata | .................. B60W 20/30 701/53 |
| 2006/0042284 A1 | 3/2006 | Heberle et al. | |
| 2007/0022835 A1 | 2/2007 | Kilian et al. | |
| 2009/0075774 A1* | 3/2009 | Tabata | .................. B60W 20/30 475/150 |
| 2009/0166109 A1 | 7/2009 | Duan | |
| 2010/0241326 A1* | 9/2010 | Muranaka | ........... F16H 61/0031 701/58 |
| 2011/0082609 A1* | 4/2011 | Favaretto | ................. B60K 6/36 701/22 |
| 2011/0118078 A1 | 5/2011 | Kraska et al. | |
| 2012/0010041 A1 | 1/2012 | Soliman et al. | |
| 2012/0265427 A1 | 10/2012 | Petridis et al. | |
| 2014/0012452 A1* | 1/2014 | Blessing | .................. B60K 6/48 701/22 |
| 2015/0025723 A1* | 1/2015 | Glugla | .................. B60W 10/06 701/22 |
| 2015/0046011 A1* | 2/2015 | Imai | ........................ B60K 6/52 701/22 |

FOREIGN PATENT DOCUMENTS

| | | |
|---|---|---|
| CN | 101177140 A | 5/2008 |
| CN | 101659186 A | 3/2010 |
| CN | 102328566 A | 1/2012 |
| CN | 202328527 U | 7/2012 |
| CN | 102729998 A | 10/2012 |
| CN | 103386872 A | 11/2013 |
| DE | 102008051709 A1 | 4/2010 |
| DE | 102011016131 A1 | 10/2012 |
| DE | 102011106149 A1 | 1/2013 |
| EP | 2292489 A1 | 3/2011 |
| JP | 2005045883 A | 2/2005 |
| JP | 2007126082 A | 5/2007 |
| JP | 4462169 B2 | 5/2010 |
| JP | 2012228960 A | 11/2012 |
| JP | 2012245961 A | 12/2012 |

\* cited by examiner

METHOD AND SYSTEM FOR STARTING ENGINE OF HYBRID VEHICLE

CROSS REFERENCE TO RELATED APPLICATION

This application is a national stage application of PCT application PCT/CN2014/094003, filed on Dec. 16, 2014, which claims priority to and benefits of Chinese Patent Application No. 201310690524.3, filed with the State Intellectual Property Office of P.R. China on Dec. 16, 2013. The entire content of all of the above-identified applications is incorporated herein by reference.

FIELD

The present disclosure relates to a hybrid vehicle field, and more particularly to a method for starting an engine of a hybrid vehicle, a system for starting an engine of a hybrid vehicle and a hybrid vehicle.

BACKGROUND

At present, starting of an engine of a hybrid vehicle is usually performed by a start motor mounted on a flywheel side of the engine. However, it has disadvantages of long starting time, unsmooth starting process, increased fuel consumption and pollutant emission. Moreover, it needs to frequently start the start motor when an operation mode of the hybrid vehicle is switched, thus greatly reducing life of the start motor.

SUMMARY

Embodiments of the present disclosure seek to solve at least one of the problems existing in the related art to at least some extent.

A first objective of the present disclosure is to provide a method for starting an engine of a hybrid vehicle.

A second of the present disclosure is to provide a system for starting an engine of a hybrid vehicle.

A third objective of the present disclosure is to provide a hybrid vehicle.

In order to achieve above objectives, embodiments of a first aspect of the present disclosure provide a method for starting an engine of a hybrid vehicle. The method includes: detecting a speed of the hybrid vehicle when receiving an instruction to start the engine; and outputting an inertia torque generated by a transmission of the hybrid vehicle to a crankshaft of the engine to start the engine when the speed is larger than or equal to a predetermined speed.

With the method according to embodiments of the present disclosure, by detecting the speed of the hybrid vehicle and outputting the inertia torque generated by the transmission to start the engine when the speed is larger than or equal to the predetermined speed, a smoothness of a power output of the hybrid vehicle during an operation mode switching thereof is effectively improved, and a frequent start of a start motor is avoided, such that life of the start motor is extended. In addition, the method also has advantages of lower fuel consumption and less pollutant emission, which saves energy and protects environment.

Embodiments of a second aspect of the present disclosure provide a system for starting an engine of a hybrid vehicle. The system includes: an engine; an engine controller, connected with the engine; a motor controller, configured to receive an instruction to start the engine and to obtain a speed of the hybrid vehicle; a transmission, configured to generate an inertia torque according to the speed; and a transmission controller, connected with the motor controller and the transmission respectively, and configured to control the transmission to output the inertia torque to a crankshaft of the engine to start the engine according to the instruction to start the engine, when the speed is larger than or equal to a predetermined speed.

With the system for starting the engine of the hybrid vehicle according to embodiments of the present disclosure, by detecting the speed of the hybrid vehicle via the motor controller and outputting the inertia torque generated via the transmission to start the engine when the speed is larger than or equal to the predetermined speed, a smoothness of a power output of the hybrid vehicle during an operation mode switching thereof is effectively improved, and a frequent start of a start motor is avoided, such that life of the start motor is extended. In addition, the system also has advantages of lower fuel consumption and less pollutant emission, which saves energy and protects environment.

Embodiments of a third aspect of the present disclosure further provide a hybrid vehicle including a system for starting an engine of a hybrid vehicle as described above. When the speed is larger than or equal to the predetermined speed, the engine of the hybrid vehicle may be started by the inertia torque generated by the transmission, and thus a smoothness of a power output of the hybrid vehicle during an operation mode switching thereof is effectively improved, and a frequent start of a start motor is avoided, such that life of the start motor is extended. In addition, the vehicle also has advantages of lower fuel consumption and less pollutant emission, which saves energy and protects environment.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
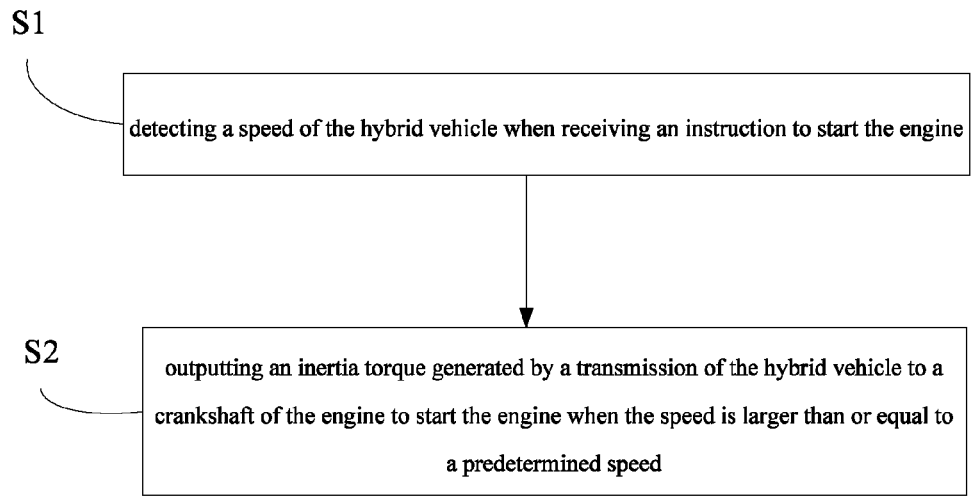
FIG. 1 is a flow chart of a method for starting an engine of a hybrid vehicle according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure.

Various embodiments and examples are provided in the following description to implement different structures of the present disclosure. In order to simplify the present disclosure, certain elements and settings will be described. However, these elements and settings are only by way of example and are not intended to limit the present disclosure. In addition, reference numerals may be repeated in different examples in the present disclosure. This repeating is for the purpose of simplification and clarity and does not refer to relations between different embodiments and/or settings. Furthermore, examples of different processes and materials are provided in the present disclosure. However, it would be appreciated by those skilled in the art that other processes and/or materials may be also applied. Moreover, a structure in which a first feature is "on" a second feature may include an embodiment in which the first feature directly contacts the second feature, and may also include an embodiment in which an additional feature is formed between the first feature and the second feature so that the first feature does not directly contact the second feature.

In the description of the present disclosure, unless specified or limited otherwise, it should be noted that, terms "mounted," "connected" and "coupled" may be understood broadly, such as electronic connection or mechanical connection, inner communication between two elements, direct connection or indirect connection via intermediary. These having ordinary skills in the art should understand the specific meanings in the present disclosure according to specific situations.

A method for starting an engine of a hybrid vehicle, a system for starting an engine of a hybrid vehicle and a hybrid vehicle will be described in the following with reference to drawings.

FIG. 1 is a flowchart of a method for starting an engine of a hybrid vehicle according to an embodiment of the present disclosure. As shown in FIG. 1, the method includes the following steps.

At step S1, when an instruction to start the engine is received, a speed of the hybrid vehicle is detected. The speed may be detected by a wheel speed sensor, and the speed is sent to a motor controller. It is understood that, in embodiments of the present disclosure, the speed of the hybrid vehicle is larger than zero.

At step S2, when the speed is larger than or equal to a predetermined speed, an inertia torque generated by a transmission of the hybrid vehicle is outputted to a crankshaft of the engine to start the engine.

In other words, the method according to an embodiment of the present disclosure may utilize an inertia torque of a reverse gear shaft of the transmission to drive a crankshaft of the engine through an input shaft of the transmission and a flywheel of the engine, and then ignite in cooperation with an ignition coil to start the engine.

In some embodiments, the inertia torque is generated according to the speed of the hybrid vehicle. According to vehicle principles, a minimum speed and a minimum starting torque have the following relationship as shown in formulas (1) and (2) as below.

$$P_e = \frac{T_{tq}n}{9550} \quad (1)$$

$$u_a = 0.377 \frac{rn}{i_g i_0} \quad (2)$$

where $P_e$ is an output power of the engine, n is a rotating speed of the engine, $T_{tq}$ is the minimum torque of the engine, $i_g$ is a transmission ratio of the transmission, $i_0$, is a transmission ratio of the main reducer, r is a radius of wheels, and $u_a$ is the minimum speed of the hybrid vehicle.

It's understood from the above two formulas that when a minimum starting torque and starting power are known, the rotating speed of the engine can be calculated according to formula (1); and then according to formula (2), a minimum speed which can reversely drive the engine successfully can be calculated. Therefore, the torque can be calculated according to the speed.

During a process of reversely driving the engine, due to inertia of the hybrid vehicle, a force may be transmitted from the ground to a half shaft through tires in a form of torque. And then the torque will be transmitted from the half shaft to the crankshaft of the engine through a differential mechanism, the main reducer, the transmission and the flywheel, thus reversely driving the engine to start.

Figure 2:
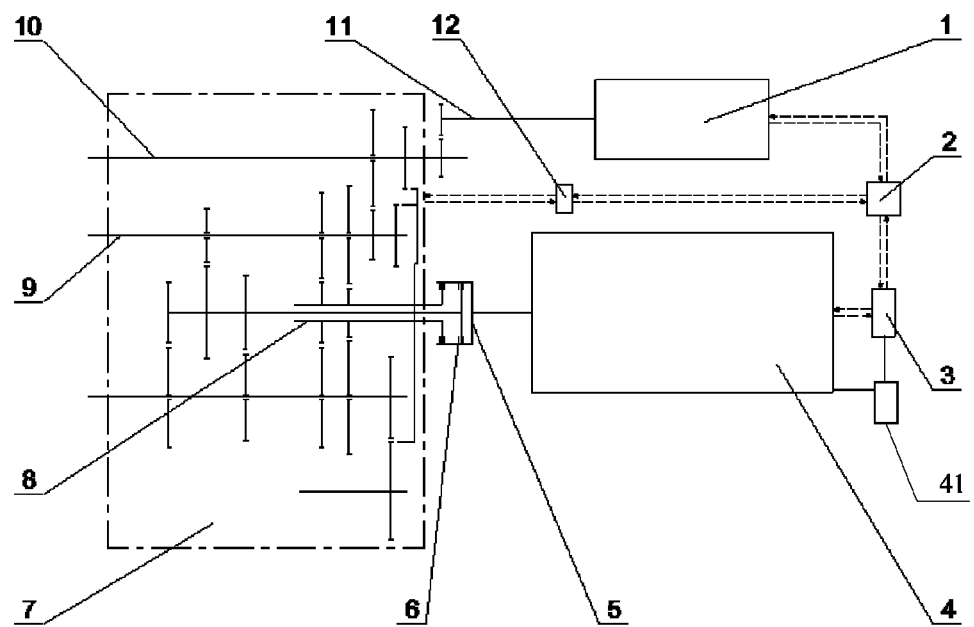
FIG. 2 is a schematic view of a system for starting an engine of a hybrid vehicle according to an embodiment of the present disclosure.

In an embodiment of the present disclosure, as shown in FIG. 2, when the transmission is a dual clutch transmission, the system 100 for a hybrid vehicle includes a motor 1, a motor controller 2, an engine controller 3, an engine 4, a flywheel 5, a clutch 6, a dual clutch transmission 7, an input shaft 8 of the dual clutch transmission and an output shaft 9 of the dual clutch transmission, a reverse gear shaft 10 of the dual clutch transmission, a motor output shaft 11 and a transmission controller 12.

Figure 3:
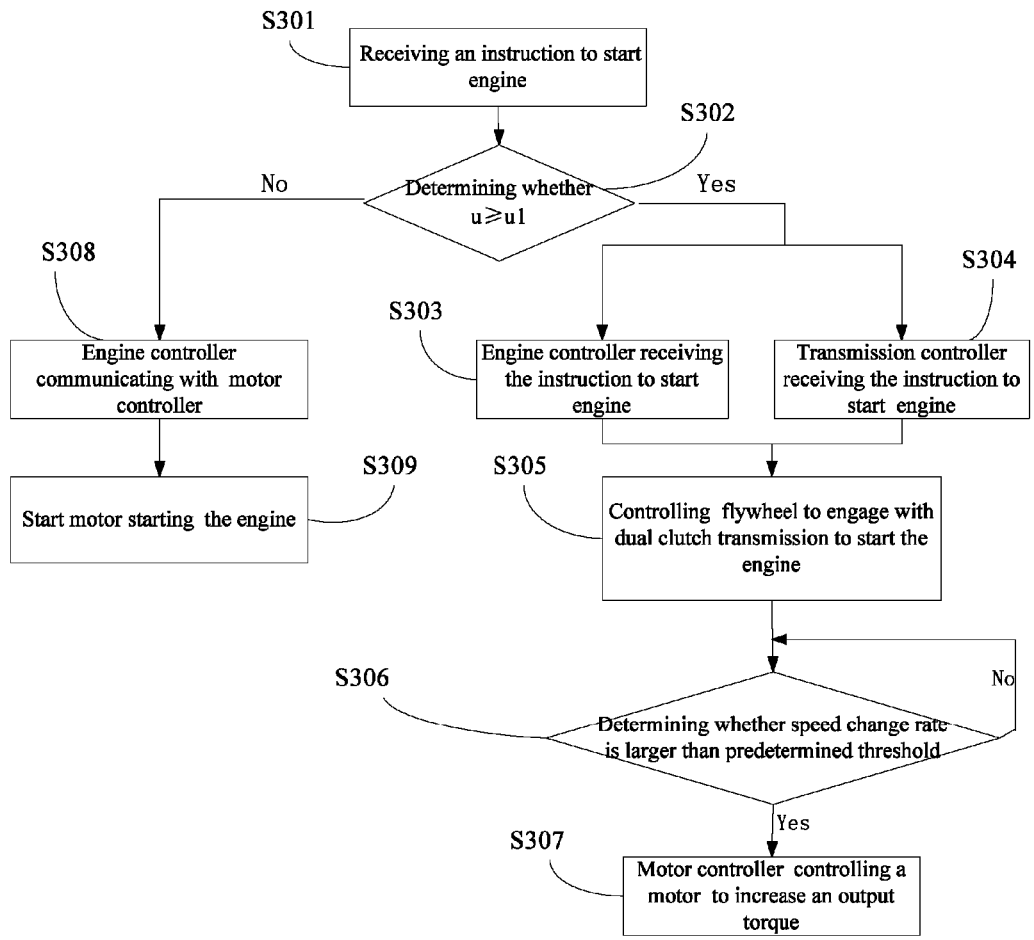
FIG. 3 is flow chart of a method for starting an engine of a hybrid vehicle according to another embodiment of the present disclosure.

In an embodiment of the present disclosure, when the hybrid vehicle is switched from an electrical mode to a hybrid mode, it is needed to start the engine. As shown in FIG. 3, the method for starting the engine of the hybrid vehicle includes the following steps.

At step S301, the motor controller receives the instruction to start the engine. In some embodiments of the present disclosure, when receiving the instruction to start the engine, the motor controller sends the instruction to the engine controller. Meanwhile, the motor and the transmission controller may also receive control information from the motor controller.

At step S302, it is determined whether the speed u of the hybrid vehicle is larger than or equal to the predetermined speed u1, i.e., the motor controller determines the speed of the hybrid vehicle; if yes, execute step S303 and step S304; if not, execute step S308, in which u1 is the minimum speed for starting the engine in the embodiment of the present disclosure.

At step S303, the engine controller receives the instruction to start the engine.

At step S304, the transmission controller receives the instruction to start the engine.

At step S305, the flywheel of the engine is engaged with the dual clutch transmission to reversely drive the engine to start.

In embodiments of the present disclosure, when the transmission is the dual clutch transmission, outputting the inertia torque generated by the transmission of the hybrid vehicle to the crankshaft of the engine to start the engine includes steps as followed: a clutch connected with the input shaft of the dual clutch transmission is controlled to engage with the flywheel of the engine to output the inertia torque to the flywheel; and the flywheel drives the crankshaft of the engine to start the engine. When the engine is started, the clutch is controlled to disengage from the flywheel.

In an embodiment of the present disclosure, when the clutch is engaged with the flywheel, the reverse gear shaft of the dual clutch transmission and the output shaft of the dual clutch transmission cooperate to output the inertia torque to the input shaft of the dual clutch transmission.

In other words, in an embodiment of the present disclosure as shown in FIG. 2, when the speed of the hybrid vehicle u is larger than or equal to the predetermined speed u1, the transmission controller 12 controls the clutch 6 to engage with the flywheel 5, so that the reverse gear shaft 10 of the dual clutch transmission and the output shaft 9 of the dual clutch transmission cooperate to output the inertia torque to the input shaft 8 of the dual clutch transmission. And then, the input shaft 8 transmits the inertia torque to the flywheel 5 of the engine via the clutch 6. However, when the flywheel 5 is reversely driven to rotate and the engine 4 is started, the transmission controller 12 controls the clutch 6 to disengage from the flywheel 5 immediately, and then the flywheel 5 drives the crankshaft of the engine 4 to rotate.

In an embodiment of the present disclosure, when the inertia torque is transmitted to the crankshaft of the engine, the engine is controlled to cooperate with an operation of the crankshaft to inject fuel, ignite, and act to start the engine according to the instruction to start the engine. In other words, the motor controller communicates with the engine controller to send instructions to the engine controller, and the engine controller controls the engine to cooperate with the operation of the crankshaft to inject fuel, ignite, and act to start the engine according to the instruction to start the engine.

In an embodiment of the present disclosure, the method further includes a step of controlling the transmission to select a gear to be matched with a power of the engine according to the speed of the hybrid vehicle, after the engine is started.

Furthermore, after selecting a gear, it is determined whether an output power of the engine satisfies a speed change demand, and a motor of the hybrid vehicle is controlled to stop outputting power, if the output power of the engine satisfies the speed change demand. And the motor of the hybrid vehicle is controlled to continue outputting power, if the output power of the engine cannot satisfy the speed change demand.

In other words, when the engine is successfully started, the transmission determines according to the speed of the hybrid vehicle to select the proper gear to be matched with the power of the engine. And after the gear is selected, the motor controller determines whether the output power of the engine satisfies the speed change demand according to a speed change due to a control strategy of a hybrid vehicle. If the output power of the engine satisfies the speed change demand, the motor of the hybrid vehicle is controlled to stop outputting power. If the output power of the engine cannot satisfy the speed change demand, the motor of the hybrid vehicle is controlled to continue outputting power.

When the dual clutch transmission engages with the flywheel of the engine, a dragging status may occur, i.e., the output torque of the hybrid vehicle may be decreased sharply within a few tenths of a second, which may lead to an instantaneous power shortage. To avoid this situation, step S306 is executed after step S305 as shown in FIG. 3.

At step S306, it is determined whether a speed change rate of the hybrid vehicle is larger than a predetermined threshold, if the speed change rate of the hybrid vehicle is larger than the predetermined threshold, execute step S307; otherwise, return to step S306.

At step S307, a motor of the hybrid vehicle is controlled to increase an output torque to compensate the inertia torque.

In some embodiments of the present disclosure, when the engine is started, it is determined whether the speed change rate of the hybrid vehicle is larger than the predetermined threshold. That is, it is determined whether the speed of the hybrid vehicle is decreased sharply. If yes, the motor of the hybrid vehicle is controlled to increase the output torque to compensate the inertia torque.

In other words, the motor has a torque compensation function, such that when the dragging status occurs, i.e., the torque of the hybrid vehicle is decreased sharply, the motor controller may control the motor to increase the output torque to satisfy a required output torque of the hybrid vehicle by detecting the speed of the hybrid vehicle, thus ensuring a ride comfort of the hybrid vehicle when the engine is started. When the torque compensation is completed, an operation state of the motor is controlled by the motor controller, for example, the motor may be controlled to charge a power battery.

At step S308, the engine controller communicates with the motor controller.

At step S309, the start motor starts the engine. In some embodiments, the start motor is powered by a battery.

In other words, when the speed of the hybrid vehicle is less than the predetermined speed, the start motor is controlled to start the engine. That is, when the speed u of the hybrid vehicle is less than the predetermined speed u1, the motor controller communicates with the engine controller to control the engine to start via the start motor. And the transmission controller determines according to the speed of the hybrid vehicle to select the proper gear to be matched with the power of the engine. After the gear is selected, an operation control state of the motor is the same as the operation control state when the speed of the hybrid vehicle u is larger than or equal to the predetermined speed u1 and is omitted herein.

In summary, with the method according to embodiments of the present disclosure, the engine is reversely driven by the transmission to start without starting the start motor when the speed of the hybrid vehicle is larger than or equal to the predetermined speed.

With the method according to embodiments of the present disclosure, by detecting the speed of the hybrid vehicle and outputting the inertia torque generated by the transmission to start the engine when the speed is larger than or equal to the predetermined speed, a smoothness of a power output of the hybrid vehicle during an operation mode switching thereof is effectively improved, and a frequent start of the start motor is avoided, such that life of the start motor is extended. In addition, the method also has advantages of lower fuel consumption and less pollutant emission, which saves energy and protects environment.

FIG. 2 is schematic view of a system for starting an engine of a hybrid vehicle according to an embodiment of the present disclosure. As shown in FIG. 2, a system 100 for starting an engine of a hybrid vehicle includes: a motor controller 2, an engine controller 3, an engine 4, a transmission 7 and a transmission controller 12.

Specifically, the engine controller 3 is connected to the engine 4. The motor controller 2 is configured to receive an instruction to start the engine and to obtain a speed of the hybrid vehicle, in which the motor controller 2 obtains the speed of the hybrid vehicle via a wheel speed sensor. The transmission 7 is configured to generate an inertia torque according to the speed of the hybrid vehicle. The transmission controller 12 is connected with the motor controller 2 and the transmission 7 respectively and is configured to output the inertia torque to a crankshaft (not shown) of the engine 4 to start the engine 4 according to an instruction to start the engine, when the speed is larger than or equal to a predetermined speed.

As shown in FIG. 2, when the transmission is a dual clutch transmission, the system further includes a motor 1, a flywheel 5 of the engine 4, a clutch 6, an input shaft 8 of the transmission 7 and an output shaft 9 of the transmission 7, a reverse gear shaft 10 of the transmission 7, a motor output shaft 11.

In an embodiment of the present disclosure, the transmission controller 12 is configured to control the clutch 6 connected with the input shaft 8 of the dual clutch transmission 7 to engage with the flywheel 5 of the engine 4 to output the inertia torque to the flywheel 5, and the flywheel 5 drives the crankshaft of the engine 4 to start the engine 4. When the engine 4 is started, the transmission controller 12 controls the clutch 6 to disengage from the flywheel 5.

When the clutch 6 is engaged with the flywheel 5, the reverse gear shaft 10 of the dual clutch transmission 7 and the output shaft 11 of the dual clutch transmission 7 cooperate to output the inertia torque to the input shaft 8 of the dual clutch transmission 7.

That is, in an embodiment of the present disclosure as shown in FIG. 2, when the speed u of the hybrid vehicle is larger than or equal to the predetermined speed, the transmission controller 12 controls the clutch 6 to engage with the flywheel 5, so that the reverse gear shaft 10 of the dual clutch transmission and the output shaft 10 of the dual clutch transmission can cooperate to output the inertia torque to the input shaft 8 of the dual clutch transmission 7. And then, the input shaft 8 transmits the inertia torque to the flywheel 5 of the engine 4 via the clutch 6. However, when the flywheel 5 is reversely driven to rotate and the engine is started, the transmission controller 12 controls the clutch 6 to disengage from the flywheel 5 immediately, and then the flywheel 5 drives the crankshaft of the engine 4 to rotate.

In some embodiments of the present disclosure, the motor controller 2 receives the instruction to start the engine and sends the instruction to the transmission controller 12 and engine controller 3. When the inertia torque is transmitted to the crankshaft of the engine 4, the engine controller 3 controls the engine 4 to cooperate with an operation of the crankshaft to inject fuel, ignite, and act to start the engine 4 according to the instruction to start the engine.

In some embodiments of the present disclosure, when the engine 4 is started, the transmission controller 12 is configured to control the transmission 7 to select a gear to be matched with a power of the engine 4 according to the speed of the hybrid vehicle. Moreover, the motor controller 2 communicates with the engine controller 3 to determine whether an output power of the engine 4 satisfies a speed change demand. If the output power of the engine satisfies the speed change demand, the motor controller 2 controls the motor 1 of the hybrid vehicle to stop outputting power. Otherwise, the motor controller 2 controls the motor 1 of the hybrid vehicle to continue outputting power.

That is, when the engine 4 is successfully started, the transmission controller 12 determines according to the speed of the hybrid vehicle to select the gear to be matched with the power of the engine 4. And after the gear is selected, the motor controller 2 determines whether the output power of the engine 4 satisfies the speed change demand according to a speed change due to a control strategy of the hybrid vehicle. If the output power of the engine 4 satisfies the speed change demand, the motor 1 of the hybrid vehicle is controlled to stop outputting power. If the output power of the engine cannot satisfy the speed change demand, the motor 1 of the hybrid vehicle is controlled to continue outputting power.

When the dual clutch transmission 7 engages with the flywheel 5 of the engine 4, a dragging status may occur, i.e., the output torque of the hybrid vehicle may be decreased sharply within a few tenths of second, which may lead to instantaneous power shortage. To avoid this situation, when the engine 4 is started, the motor controller 2 determines whether a speed change rate of the hybrid vehicle is larger than a predetermined threshold. If the speed change rate of the hybrid vehicle is larger than the predetermined threshold, the motor controller 2 controls the motor 1 of the hybrid vehicle to increase an output torque to compensate the inertia torque. Therefore, when the dragging status occurs, i.e., the output torque of the hybrid vehicle is decreased sharply, the motor controller 2 may control the motor 1 to increase the output torque to satisfy a required output torque by detecting the speed of the hybrid vehicle, thus ensuring a ride comfort of the hybrid vehicle when the engine is started.

In some embodiments of the present disclosure, the system further includes a start motor 41. The start motor 41 is connected with the engine 4. When the speed of the hybrid vehicle is less than the predetermined speed, the start motor 41 is controlled to start the engine 4. That is, when the speed u of the hybrid vehicle is less than the predetermined speed u1, the motor controller 2 communicates with the engine controller 3 to control the engine 4 to start via the start motor 41.

In summary, the engine 4 is started by driving the crankshaft of the engine 4 reversely cooperated with an ignition of the ignition coil without starting the start motor 41 when the speed of the hybrid vehicle is larger than or equal to the predetermined speed, in which the crankshaft of the engine 4 is driven by the input shaft 8 of the transmission 7 and the flywheel 5 of the engine 4 with using the inertia torque of the reverse gear shaft 10 of the transmission 7.

With the system for starting the engine of the hybrid vehicle according to embodiments of the present disclosure, by detecting the speed of the hybrid vehicle via the motor controller and outputting the inertia torque generated via the transmission to start the engine when the speed is larger than or equal to the predetermined speed, a smoothness of a power output of the hybrid vehicle during an operation mode switching thereof is effectively improved, and a frequent start of the start motor is avoided, such that life of the start motor is extended. In addition, the system also has advantages of lower fuel consumption and less pollutant emission, which saves energy and protects environment.

Embodiments of the present disclosure further provide a hybrid vehicle including the system 100 for starting an engine of a hybrid vehicle as described above. When the speed is larger than or equal to the predetermined speed, the engine of the hybrid vehicle may be started by the inertia torque generated by the transmission, and thus a smoothness of a power output of the hybrid vehicle during an operation mode switching thereof is effectively improved, and a frequent start of a start motor is avoided, such that life of the start motor is extended. In addition, the vehicle also has advantages of lower fuel consumption and less pollutant emission, which saves energy and protects environment.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system including processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for starting an engine of a hybrid vehicle with a dual clutch transmission, comprising:
   detecting a speed of the hybrid vehicle when receiving an instruction to start the engine;
   determining whether the speed is larger than or equal to a predetermined speed;
   when it is determined that the speed is larger than or equal to the predetermined speed, deciding that the engine of the hybrid vehicle is to be started without engaging a start motor;
   outputting an inertia torque generated by a reverse gear shaft of the dual clutch transmission of the hybrid vehicle to drive a crankshaft of the engine to start the engine, comprising:
      controlling a clutch connected with an input shaft of the dual clutch transmission to engage with a flywheel of the engine to output the inertia torque to the flywheel; and
      driving, by the flywheel, the crankshaft of the engine to operate so as to start the engine; and
   when the clutch is engaged with the flywheel, cooperating the reverse gear shaft of the dual clutch transmission and an output shaft of the dual clutch transmission to the input shaft of the dual clutch transmission.

2. The method according to claim 1, wherein the inertia torque is generated according to the speed of the hybrid vehicle.

3. The method according to claim 1, further comprising:
   controlling the clutch to disengage from the flywheel after the engine is started.

4. The method according to claim 1, further comprising:
   controlling the engine to cooperate with an operation of the crankshaft to inject fuel, ignite and act to start the engine according to the instruction to start the engine, when the inertia torque is outputted to the crankshaft of the engine.

5. The method according to claim 1, further comprising:
   controlling the dual clutch transmission to select a gear to be matched with a power of the engine according to the speed of the hybrid vehicle, after the engine is started.

6. The method according to claim 5, further comprising:
   determining whether an output power of the engine satisfies a speed change demand; and
   controlling a motor of the hybrid vehicle to stop outputting power, if the output power of the engine satisfies the speed change demand; and controlling the motor of the hybrid vehicle to continue outputting power, if the output power of the engine dissatisfies the speed change demand.

7. The method according to claim 1, further comprising:
determining whether a speed change rate of the hybrid vehicle is larger than a predetermined threshold when the engine is started; and
when yes, controlling a motor of the hybrid vehicle to increase an output torque to compensate the inertia torque.

8. A system for starting an engine of a hybrid vehicle with a dual clutch transmission, comprising:
an engine;
an engine controller, connected with the engine;
a motor controller, configured to receive an instruction to start the engine and to obtain a speed of the hybrid vehicle;
the dual clutch transmission, configured to generate an inertia torque according to the speed; and
a transmission controller, connected with the motor controller and the dual clutch transmission respectively, and configured to control a reverse gear shaft of the dual clutch transmission to output the inertia torque to drive a crankshaft of the engine to start the engine according to the instruction to start the engine without engaging a start motor, when the speed is larger than or equal to a predetermined speed, wherein:
the transmission controller is configured to control a clutch connected with the input shaft of the dual clutch transmission to engage with a flywheel of the engine to output the inertia torque to the flywheel, and the flywheel is configured to drive the crankshaft to operate so as to start the engine; and
when the clutch is engaged with the flywheel, the reverse gear shaft of the dual clutch transmission and an output shaft of the dual clutch transmission cooperate to output the inertia torque to the input shaft of the dual clutch transmission.

9. The system according to claim 8, wherein the transmission controller is further configured to control the clutch to disengage from the flywheel after the engine is started.

10. The system according to claim 8, wherein when the motor controller is configured to send the instruction to start the engine to the transmission controller and the engine controller respectively.

11. The system according to claim 10, wherein when the inertia torque is outputted to the crankshaft of the engine, the engine controller is configured to control the engine to cooperate with an operation of the crankshaft to inject fuel, ignite and act to start the engine according to the instruction to start the engine.

12. The system according to claim 8, wherein after the engine is started, the transmission controller is further configured to control the dual clutch transmission to select a gear to be matched with a power of the engine according to the speed of the hybrid vehicle.

13. The system according to claim 12, further comprising a motor,
wherein the motor controller is further configured to determine whether an output power of the engine satisfies a speed change demand by communicating with the engine controller and to control the motor of the hybrid vehicle to stop outputting power, if the output power of the engine satisfies the speed change demand;
wherein the motor controller is further configured to control the motor of the hybrid vehicle to continue outputting power, if the output power of the engine dissatisfies the speed change demand.

14. The system according to claim 8, further comprising a motor,
wherein when the engine is started, the motor controller is configured to determine whether a speed change rate of the hybrid vehicle is larger than a predetermined threshold and to control the motor of the hybrid vehicle to increase an output torque to compensate the inertia torque if the speed change rate of the hybrid vehicle is larger than the predetermined threshold.

15. The system according to claim 8, further comprising the start motor connected with the engine, and configured to start the engine when the speed of the hybrid vehicle is less than the predetermined speed.

16. A hybrid vehicle, comprising a system for starting an engine of a hybrid vehicle with a dual clutch transmission, the system comprising:
an engine;
an engine controller, connected with the engine;
a motor controller, configured to receive an instruction to start the engine and to obtain a speed of the hybrid vehicle;
the dual clutch transmission, configured to generate an inertia torque according to the speed; and
a transmission controller, connected with the motor controller and the dual clutch transmission respectively, and configured to control a reverse gear shaft of the dual clutch transmission to output the inertia torque to drive a crankshaft of the engine to start the engine according to the instruction to start the engine without engaging a start motor, when the speed is larger than or equal to a predetermined speed, wherein:
the transmission controller is configured to control a clutch connected with the input shaft of the dual clutch transmission to engage with a flywheel of the engine to output the inertia torque to the flywheel, and the flywheel is configured to drive the crankshaft to operate so as to start the engine; and
when the clutch is engaged with the flywheel, the reverse gear shaft of the dual clutch transmission and an output shaft of the dual clutch transmission cooperate to output the inertia torque to the input shaft of the dual clutch transmission.

17. The hybrid vehicle according to claim 16, wherein the transmission controller is further configured to control the clutch to disengage from the flywheel after the engine is started.

18. The hybrid vehicle according to claim 16, wherein after the engine is started, the transmission controller is further configured to control the dual clutch transmission to select a gear to be matched with a power of the engine according to the speed of the hybrid vehicle.

\* \* \* \* \*